US008195247B2

(12) United States Patent
Lee et al.

(10) Patent No.: US 8,195,247 B2
(45) Date of Patent: Jun. 5, 2012

(54) CABLE SENSE MODE FOR INTELLIGENT POWER SAVING IN ABSENCE OF LINK PULSE

(75) Inventors: Jonathan F. Lee, Dublin, CA (US); Gregory Youngblood, Santa Clara, CA (US); David (Wei) Wang, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1078 days.

(21) Appl. No.: 11/269,414

(22) Filed: Nov. 8, 2005

(65) Prior Publication Data
US 2007/0104124 A1    May 10, 2007

(51) Int. Cl.
*H04M 1/00* (2006.01)
(52) U.S. Cl. ......... 455/574; 455/69; 455/522; 455/572; 455/343.1; 455/343.2; 455/343.4; 455/343.5; 370/318; 370/311; 713/320; 713/323
(58) Field of Classification Search .................. 370/311, 370/318, 252; 455/522, 574, 343.2, 343.4, 455/343.5, 343.1, 69; 713/320, 323
See application file for complete search history.

(56) References Cited

U.S. PATENT DOCUMENTS

| 5,627,412 | A | | 5/1997 | Beard | |
|---|---|---|---|---|---|
| 6,026,494 | A | * | 2/2000 | Foster | 713/320 |
| 6,105,151 | A | * | 8/2000 | Mahalingam et al. | 714/48 |
| 6,169,475 | B1 | * | 1/2001 | Browning | 340/286.02 |
| 6,442,142 | B1 | * | 8/2002 | Bar-Niv | 370/252 |
| 6,618,814 | B1 | * | 9/2003 | Gaur et al. | 713/323 |
| 6,820,225 | B1 | * | 11/2004 | Johnson et al. | 714/715 |
| 7,119,701 | B2 | * | 10/2006 | Browning | 709/225 |
| 7,278,039 | B1 | * | 10/2007 | Lo | 713/320 |
| 7,330,987 | B2 | * | 2/2008 | Morisawa | 713/321 |
| 7,519,842 | B2 | * | 4/2009 | Chen et al. | 713/310 |
| 7,536,202 | B2 | * | 5/2009 | Hsu et al. | 455/557 |
| 7,555,663 | B2 | * | 6/2009 | Krantz et al. | 713/324 |
| 7,564,810 | B2 | * | 7/2009 | Hernandez et al. | 370/311 |
| 7,653,526 | B1 | * | 1/2010 | Ryle et al. | 703/23 |
| 2002/0132603 | A1 | * | 9/2002 | Lindskog et al. | 455/343 |

FOREIGN PATENT DOCUMENTS

TW    595163    6/2004
* cited by examiner

*Primary Examiner* — Olumide T Ajibade Akonai
(74) *Attorney, Agent, or Firm* — Brinks Hofer Gilson & Lione

(57) ABSTRACT

Certain embodiments of a cable sense mode for intelligent power saving in the absence of a link pulse may include detecting an energy level of an Ethernet link. The Ethernet link may couple a network adapter chip to a network. The power supplied to the network adapter chip may be adjusted based on the detected energy level. Power may be supplied to the network adapter chip if the detected energy level of the Ethernet link is greater than or equal to a particular energy level. Power may be reduced to the network adapter chip if the detected energy level of the Ethernet link is less than a particular energy level. An output signal and/or an interrupt signal may be generated that indicates a change in the detected energy level of the Ethernet link. Power may be provided to the circuitry that generates the output signal and the interrupt signal.

30 Claims, 9 Drawing Sheets

CABLE SENSE MODE FOR INTELLIGENT POWER SAVING IN ABSENCE OF LINK PULSE

CROSS-REFERENCE TO RELATED APPLICATIONS/INCORPORATION BY REFERENCE

This application makes reference to, claims priority to, and claims the benefit of:

U.S. patent application Ser. No. 11/269,419 filed Nov. 8, 2005; and

U.S. patent application Ser. No. 11/269,064 filed Nov. 8, 2005.

The above stated application is hereby incorporated herein by reference in its entirety.

FIELD OF THE INVENTION

Certain embodiments of the invention relate to integrated circuits or chips. More specifically, certain embodiments of the invention relate to a cable sense mode for intelligent power saving in the absence of a link pulse.

BACKGROUND OF THE INVENTION

It is desirable to be able to completely power down a device when it is not in use or when it is disabled. For example, a laptop computer may have a wired LAN adapter and a wireless LAN adapter installed. When the laptop computer is moved from one location to another, the wireless LAN adapter may be used, for example, when no wired connection is available, and the wired LAN adapter may not be needed. Accordingly, the wired LAN adapter may be disabled to save battery power on the laptop computer. Once a laptop computer user moves to a location where wired LAN is available, he may plug in a network cable into the wired LAN adapter. However, the laptop computer user may have to take steps to manually turn on the LAN circuitry.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a cable sense mode for intelligent power saving in the absence of a link pulse, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a cable sense mode for intelligent power saving in the absence of a link pulse. Aspects of the method may comprise detecting within a network adapter chip energy level of an Ethernet link. The Ethernet link may couple the network adapter chip to a network. The power supplied to the network adapter chip may be adjusted based on the detected energy level. A link pulse may be indicative of the detected energy level of the Ethernet link.

Figure 1:
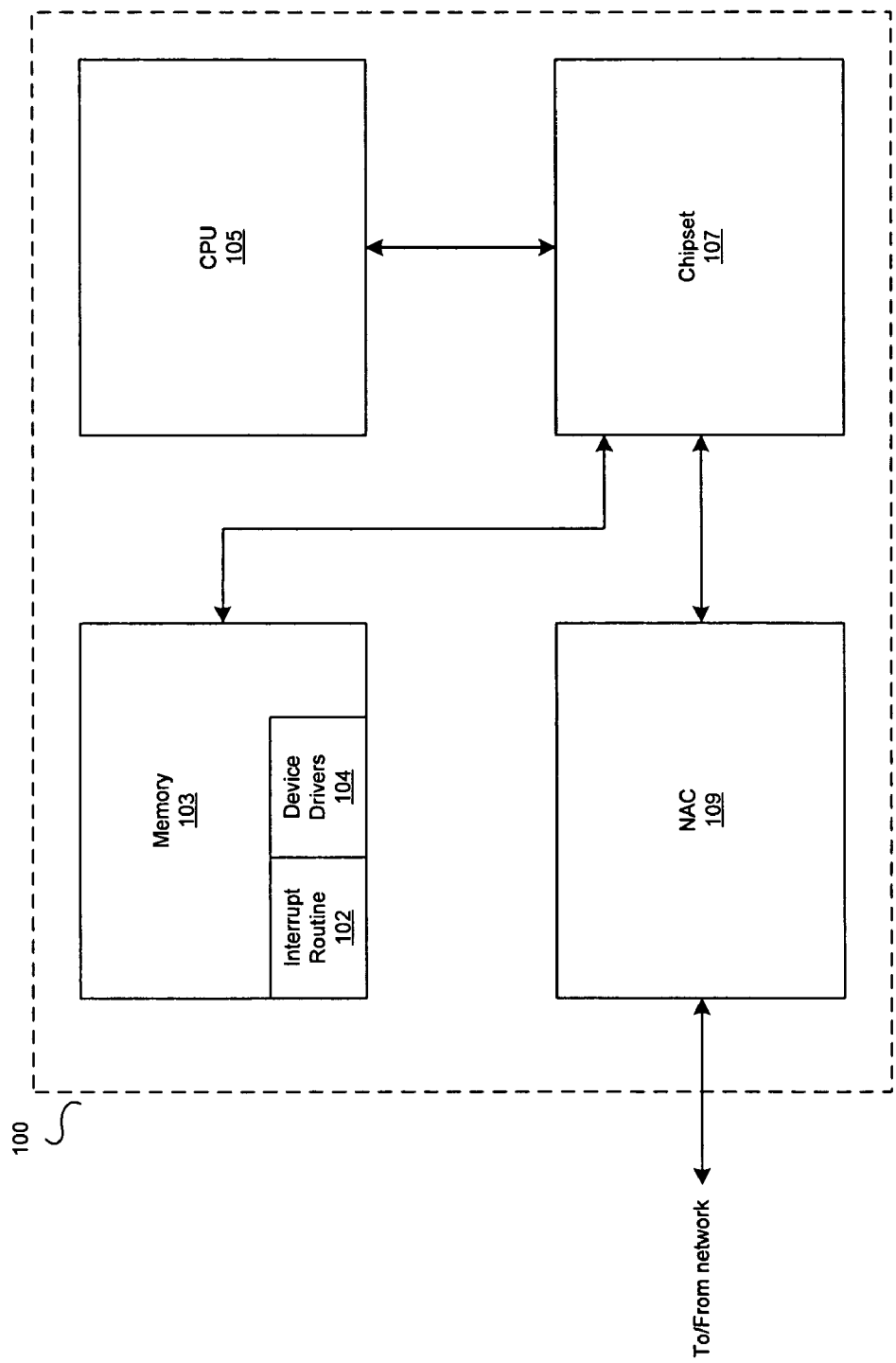
FIG. 1 is a block diagram illustrating an exemplary network adapter card, which may be utilized in connection with an embodiment of the invention.

FIG. 1 is a block diagram illustrating an exemplary network adapter card, which may be utilized in connection with an embodiment of the invention. Referring to FIG. 1, there is shown a laptop 100 with a few of the internal components, for example, a memory block 103, a CPU 105, a chipset 107, and a network adapter chip (NAC) 109. There may be interrupt routines, for example, interrupt routines 102, stored on the memory block 103. The interrupt routines 102 may be code and/or data that may allow the CPU 105 to execute instructions in response to a hardware or software interrupt signals. Various hardware devices may also need device drivers, for example, the device drivers 104, and the device drivers 104 may be stored in the memory block 103. The device drivers 104 may be code and/or data that may allow a level of abstraction in accessing hardware, for example, the NAC 109. The CPU 105 may communicate with the memory block 103 and the chipset 107, and the chipset 107 may communicate with the NAC 109. The NAC 109 may be physically connected to a network, such as, for example, an Ethernet network, via a cable. In this manner, the NAC 109 may transmit data to the network and receive data from the network.

The memory block 103 may comprise suitable logic, circuitry, and/or code that may be adapted to store a plurality of control, status and/or data information. The information stored in memory block 103 may be accessed by other processing blocks, such as, for example, the CPU 105.

The CPU 105 may comprise suitable logic, circuitry, and/or code that may be adapted to process data that may be read from, for example, the memory block 103. The CPU may store data in the memory block 103, and/or communicate data, status, and/or commands with other devices in the laptop, for example, the chipset 107 and/or the NAC 109.

The chipset 107 may comprise suitable logic, circuitry, and/or code that may be adapted to manage input/output data such as voice and/or data traffic from the CPU to the memory block 103 and/or peripheral devices, for example, the NAC 109.

The NAC 109 may comprise suitable logic, circuitry, and/or code that may be adapted to physically interface to the network, for example, the Ethernet network, via a cable. Accordingly, the laptop 100 may send and receive data to and from the Ethernet network.

In operation, the CPU 105 may communicate data to the NAC 109 for transmission to a network destination. Data may be received from a network source, for example, an external computer that may also be on the network, and the NAC 109 may indicate to the CPU 105 the availability of the received data. The CPU 105 may then process the data and/or save the data in the memory block 103.

Figure 2A:
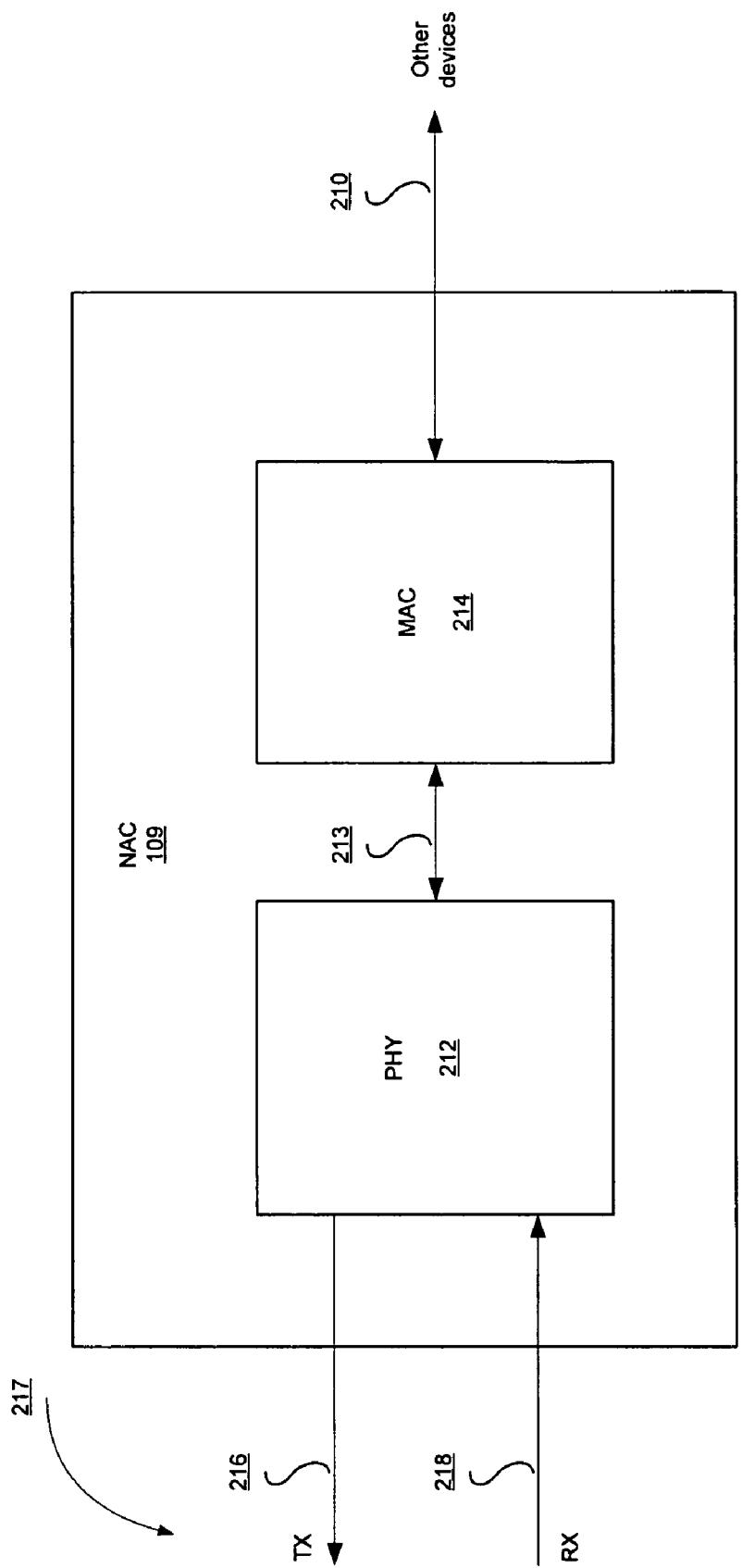
FIG. 2a is a block diagram illustrating an exemplary physical layer device and media access controller, which may be utilized in connection with an embodiment of the invention.

FIG. 2*a* is a block diagram illustrating an exemplary physical layer device and media access controller, which may be utilized in connection with an embodiment of the invention. Referring to FIG. 2, there is shown the NAC 109 that may comprise a physical network interface layer (PHY) 212 and a media access controller (MAC) 214.

The PHY 212 may comprise suitable logic, circuitry, and/or code that may be adapted to interface to a network, for example, an Ethernet network. For example, the PHY 212 may be fully compatible with at least IEEE 802.3 standard for auto-negotiation of data transfer speed, where the IEEE 802.3 may be the IEEE standard for Ethernet.

The MAC 214 may comprise suitable logic, circuitry, and/or code that may be adapted to properly format data for packet transmission on, for example, the Ethernet network. The MAC 214 may also be adapted to receive data from the Ethernet network and to remove the Ethernet network related frame information so that higher level protocols may extract desired information from the received frame.

In operation, the PHY 212 may communicate data to the Ethernet network via a transmit and receive interface 217. The transmit and receive interface 217 may comprise a serial transmit interface 216 and a serial receive interface 218. The PHY 212 may receive Ethernet network data via the serial receive interface 218, and transmit data to the Ethernet network via the serial transmit interface 216. The PHY 212 may sense collision when transmitting data and may comply with the Carrier Sense Multiple Access/Collision Detect (CSMA/CD) access method defined in IEEE 802.3

The MAC 214 may receive data from, for example, the CPU 105 (FIG. 1), and form appropriate frames for the Ethernet network, for example. The MAC 214 may communicate the frames to the PHY 212 via the interface 213 between the PHY 212 and the MAC 214. Additionally, the MAC 214 may receive data from the network via the PHY 212. The MAC 214 may remove the network related information, for example, the Ethernet protocol information, and may communicate the remaining data to, for example, the CPU 105 via, for example, a PCI Express bus 210. The CPU 105 may process the received frame to retrieve data that may have been sent by another application on the network.

Figure 2B:
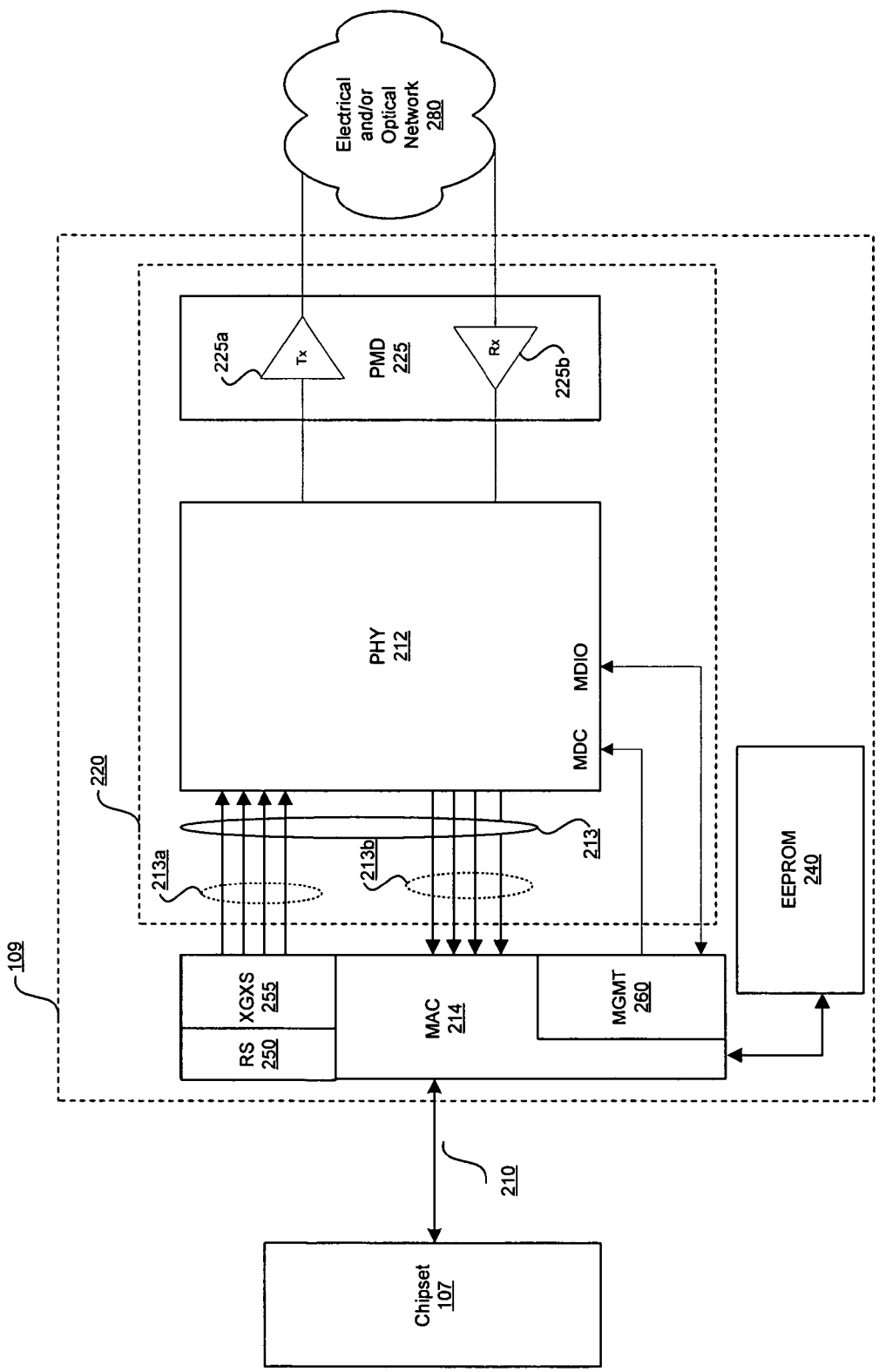
FIG. 2b is a block diagram of an exemplary Ethernet transceiver module and a media access controller, in accordance with an embodiment of the invention.

FIG. 2*b* is a block diagram of an exemplary Ethernet transceiver module and a media access controller, in accordance with an embodiment of the invention. Referring to FIG. 2*b*, there is illustrated a chipset 107, a network adapter chip (NAC) 109, and a network 280. The NAC 109 may comprise the MAC 214, a transceiver module 220, and an EEPROM 240. The transceiver module 220 may comprise the PHY 212 and a physical medium dependent (PMD) transceiver 225.

The PMD transceiver 225 may comprise a PMD transmitter 225*a* and a PMD receiver 225*b*. The chipset 107 may interface with the MAC 214 through the PCI Express bus 210 and may communicate with the network 280 through the transceiver module 220. The network 280 may be an electrical and/or optical network. The PMD transmitter 225*a* and a PMD receiver 225*b* may not be needed in cases when the network 280 is an electrical network.

Transceiver module 220 may be configured to communicate data between the chipset 107 and the network 280. The data transmitted and/or received may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, a layer 1 may provide services to a layer 2 and the layer 2 may provide services to a layer 3. A data link layer, the layer 2, may include a MAC layer whose functionality may be handled by the MAC 214. In this regard, the MAC 214 may be configured to implement the well-known IEEE 802.3 Ethernet protocol.

In an embodiment of the invention, the MAC 214 may represent the layer 2 and the transceiver module 220 may represent the layer 1. The layer 3 and above may be represented by a CPU, for example, the CPU 105 (FIG. 1), which may be accessed from the NAC 109 via the chipset 107. The CPU 105 may be configured to build five highest functional layers for data packets that are to be transmitted over the network 280. Since each layer in the OSI model may provide a service to the immediately higher interfacing layer, the MAC 214 may provide the necessary services to the CPU 105 to ensure that packets are suitably formatted and communicated to the transceiver module 220. During transmission, each layer may add its own header to the data passed on from the interfacing layer above it. However, during reception, a compatible device having a similar OSI stack may strip off the headers as the message passes from the lower layers up to the higher layers.

The transceiver module 220 may be configured to handle all the physical layer requirements, which may include, but is not limited to, packetization and data transfer. The transceiver module 220 may operate at a plurality of data rates, which may include 10 Mbps, 100 Mbps and 1 Gbps, for example. Data packets received by the transceiver module 220 from the MAC 214 may include data and header information for each of the above six functional layers. The transceiver module 220 may be configured to encode data packets that are to be transmitted over the network 280. The transceiver module 220 may also be configured to decode data packets received from the network 280.

The MAC 214 may interface with the PHY 212 through, for example, the interface 213. The interface 213 may be a low pin count, self-clocked bus. The interface 213 may act as an extender interface for a media independent interface (XMGII). In this regard, MAC 214 may also include a reconciliation sublayer (RS) interface 250 and an XGMII extender sublayer (XGXS) interface 255. The MAC 214 may also include an integrated link management (MGMT) interface 260 that may facilitate communication between the MAC 214 and a management data input/output (MDIO) interface of the PHY 212.

The PMD transceiver 225 may include at least one PMD transmitter 225*a* and at least one PMD receiver 225*b*. In operation, PMD transceiver 225 may be configured to receive data from and transmit data to the network 280. The PMD transmitter 225*a* may transmit data originating from the CPU 105. The PMD receiver 225*b* may receive data destined for the CPU 105 from the network 280 and transmit the data to the CPU 105 via the chipset 107. The PMD 225 may also be configured to function as an electro-optical interface. In this regard, electrical signals may be received by PMD transmitter 225a and transmitted in a format such as optical signals over the network 280. Additionally, optical signals may be received by PMD receiver 225b and transmitted as electrical signals to the chipset 107.

The MAC module 214 may also include an EEPROM 240. The MAC module 214 may be coupled to the EEPROM 240 through an interface such as a serial interface or bus. The EEPROM 240 may be programmed with information such as, for example, parameters and/or code that may effectuate the operation of the MAC module 214. The parameters may include configuration data like MAC address and the code may include operational code such as software and/or firmware, but the information is not limited in this regard.

Figure 3A:
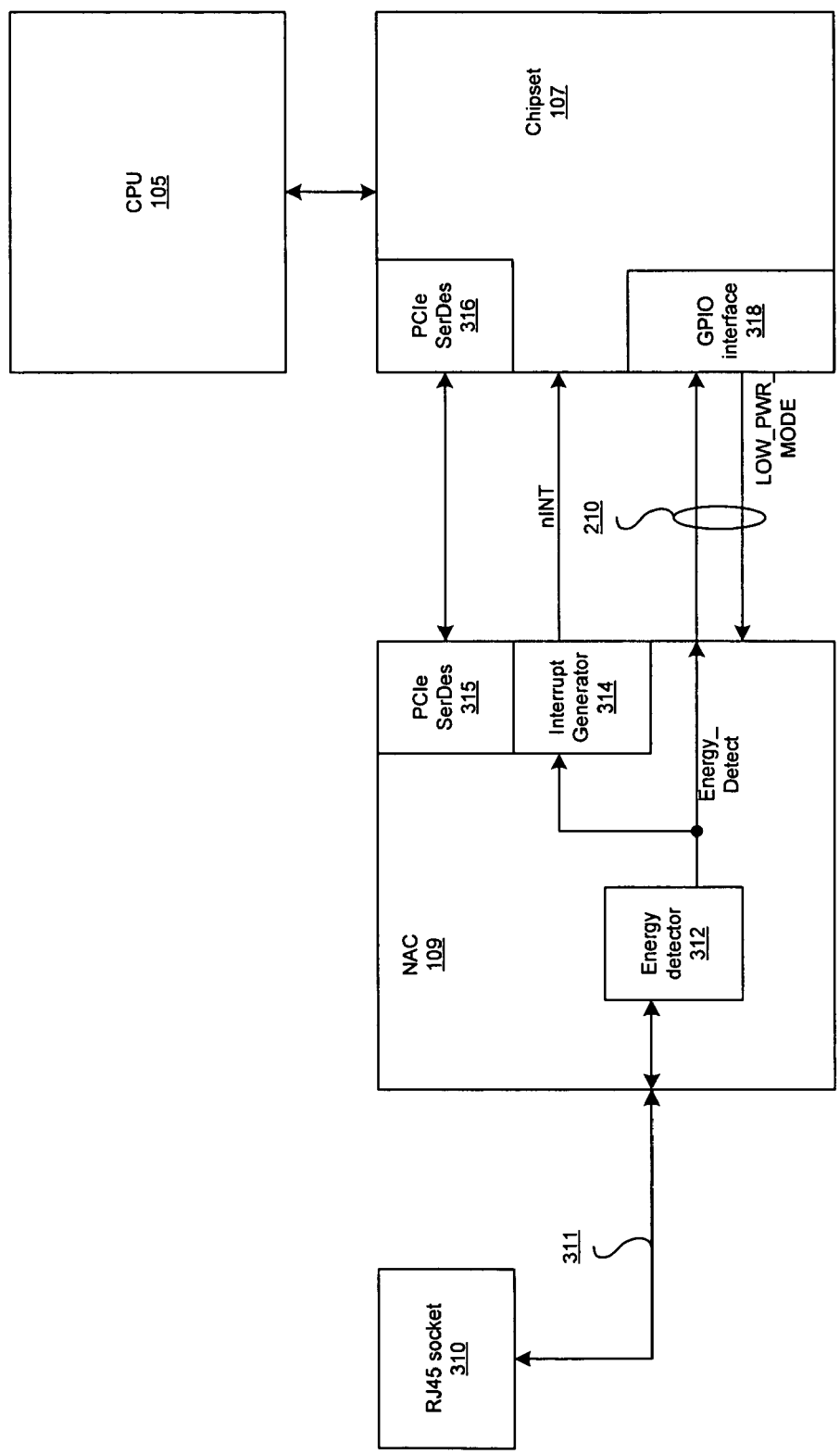
FIG. 3a is a block diagram illustrating an exemplary communication path between a chipset and a network adapter chip for power reduction mode, in accordance with an embodiment of the invention.

FIG. 3a is a block diagram illustrating an exemplary communication path between a chipset and a network adapter chip for power reduction mode, in accordance with an embodiment of the invention. Referring to FIG. 3a, there is shown the CPU 105, the chipset 107, the NAC 109, and a RJ-45 socket 310. The NAC 109 may comprise a energy detector 312, an interrupt generator 314, and a PCI Express (PCIe) serializer/deserializer (SerDes) 315. The chipset 107 may comprise a PCIe SerDes 316 and a GPIO interface 318.

The RJ-45 socket 310 may accept network cables, for example, Ethernet cables, which may be terminated by RJ-45 plugs. The energy detector 312 may comprise suitable logic, circuitry, and/or code that may be adapted to detect network activity, for example, Ethernet signal activity, which may be communicated to the energy detector 312 from the RJ-45 socket via a network link 311. If network activity is detected, the energy detector 312 may assert a network activity detected signal Energy_Detect. If the energy detector 312 does not detect network activity, it may de-assert the network activity detected signal Energy_Detect. The network activity detected signal Energy_Detect may be asserted if the energy level detected is equal to or greater than a threshold energy level. Similarly, the network activity detected signal Energy_Detect may be deasserted if the energy level detected is less than a threshold energy level. The threshold energy level may be design and/or implementation dependent.

The interrupt generator 314 may comprise suitable logic, circuitry, and/or code that may be adapted to generate an interrupt signal, which may interrupt a CPU, for example the CPU 105. As a result, the CPU 105 may execute an interrupt routine, for example, the interrupt routine 102.

The PCIe SerDes 315 and 316 may comprise suitable logic, circuitry, and/or code that may be adapted to receive parallel data and serialize it for transmission over a serial line, or receive serial data and convert it to parallel data.

The GPIO interface 318 may transmit and receive signals on the GPIO bus 210.

In operation, energy from the Ethernet network may be communicated to the energy detector 312 via the network link 311. If the energy detector 312 determines that the communicated energy level indicates network activity, the energy detector 312 may assert the network activity detected signal Energy_Detect. The network activity detected signal Energy_Detect may be communicated to the chipset 107. The chipset 107 may communicate this signal to the CPU 105, and the CPU 105 may take appropriate action. For example, the CPU 105 may take steps to ensure that the NAC 109 stays powered up, or to power up the NAC 109 if the NAC 109 is in a power-down state. Power-down state may also be referred to as a reduced power state.

If the energy detector 312 does not detect network activity, the network activity detected signal Energy_Detect may be de-asserted. As a result, the CPU 105 may power down the NAC 109. For example, the CPU 105 may cause the power down signal LOW_PWR_MODE from the chipset 107 to the NAC 109 to be asserted. Upon reception of the asserted power down signal LOW_PWR_MODE, the NAC 109 may power down by reducing voltage to at least some of the circuitry in the NAC 109. Some circuitry in the NAC 109 that may not be powered down may be, for example, the energy detector 312. The energy detector 312 may remain powered up in order for it to be able to monitor signal activity on the network.

Accordingly, the energy detector 312 may monitor the energy level of the Ethernet network while the NAC 109 is powered down. If the energy detector 312 detects sufficient energy to indicate that there is network activity, this information may be communicated to the chipset 107, and hence to the CPU 105, by asserting the network activity detected signal Energy_Detect. The CPU 105 may poll the status of the network activity detected signal Energy_Detect to determine whether network activity may be present. The CPU 105 may issue commands that may result in the power down signal LOW_PWR_MODE signal being de-asserted. In response to the de-assertion of the power down signal LOW_PWR_MODE, the NAC 109 may do a power-up reset in order to bring the NAC 109 to a known active state. The network activity detected signal Energy_Detect may be asserted during the NAC 109 power-up reset.

Alternatively, the network activity detected signal Energy_Detect may be used by the interrupt generator 314 to generate an interrupt signal that may be used to interrupt the CPU 105. Although the interrupt generator 314 may be shown as being in the NAC 109, the invention need not be so limited. For example, the interrupt generation logic may be in another chip or it may be implemented with discrete glue logic. If the interrupt generation logic is on the NAC 109, then the interrupt generation logic may also be supplied with power while the NAC 109 may be powered down.

Additionally, a device driver, for example, a portion of the device drivers 104, for the PCIe SerDes 315 may need to be disabled before the PCIe SerDes 315 is powered down. Similarly, the device driver for the PCIe SerDes 315 may need to be enabled after the PCIe SerDes 315 is powered up. Device drivers may be software and/or firmware code that may allow a level of abstraction in accessing hardware. The device driver, for example, the device driver 104 for the PCIe SerDes 315, may be enabled or disabled. If enabled, the device driver may allow access to the PCIe SerDes 315. If disabled, communication to the PCIe SerDes 315 may not be allowed.

Figure 3B:
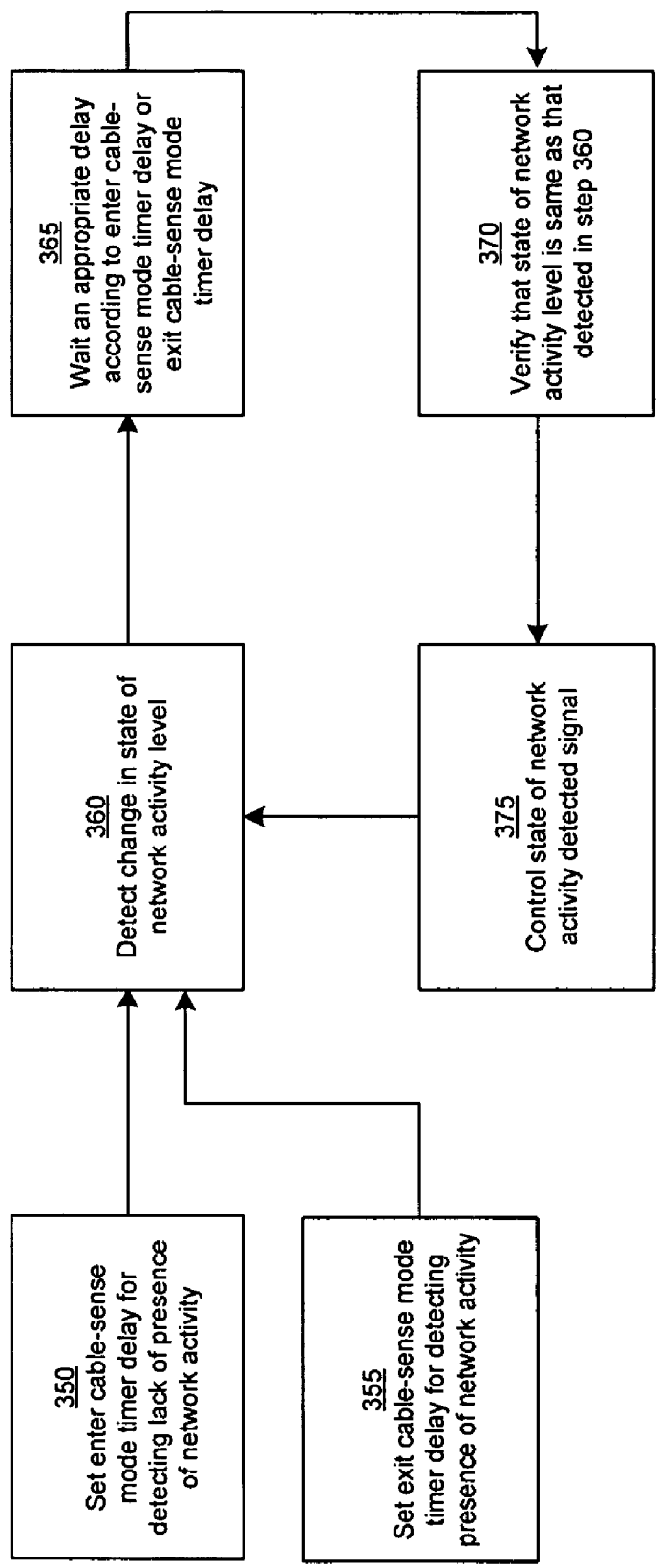
FIG. 3b is a flow diagram illustrating an exemplary routine for controlling a network activity detected signal, in accordance with an embodiment of the invention.

FIG. 3b is a flow diagram illustrating an exemplary routine for controlling a network activity detected signal, in accordance with an embodiment of the invention. Step 350 may comprise setting enter cable-sense mode timer delay for detecting lack of presence of network activity. The enter cable-sense mode timer delay may be a period of time waited before verifying lack of network activity. The delay may filter out momentary periods during which there may be a lack of network activity. Step 355 may comprise setting exit cable-sense mode timer delay for detecting presence of network activity. The exit cable-sense mode timer delay may be a period of time waited before verifying presence of network activity. This may be done to filter out spurious indications of network activity due to bursts of noise on the network. Step 360 may comprise detecting change in network activity level. Step 365 may comprise waiting an appropriate period of time to elapse after detecting change in network activity level, according to either the enter cable-sense mode timer delay or the exit cable-sense mode timer delay. Step 370 may comprise verifying that the network activity level is the same as that of step 360. Step 375 may comprise controlling the state of the network activity detected signal.

The detection of network energy level as described in the steps 350 to 375, for example, may comprise detecting an amount of energy communicated to the energy detector 312 by the network link 311, which may be an Ethernet link. The network link 311 may be connected to the Ethernet network if an Ethernet cable is plugged into the RJ-45 socket 310. Alternatively, the network link 311 may not be connected to the Ethernet network if an Ethernet cable is not plugged in to the RJ-45 socket 310. The energy detector 312 may determine whether the levels of detected energy may be indicative of network signal activity.

Referring to FIG. 3b, and with respect to FIG. 3a, in step 350, the default value for enter cable-sense mode timer delay may be changed. In step 355, the default value for exit cable-sense mode timer delay may be changed. The default timer delay values may be design and/or implementation dependent. Experimentation and usage data may be used to set the default timer delays. These timer delay values may be changed by a user to filter network glitches that may falsely indicate change in network activity level.

In step 360, the energy detector 312 may detect change in the state of the network activity level. For example, the change may be from an energy level below a threshold energy level to an energy level above the threshold level, or vice versa. The energy level below the threshold level may indicate a lack of network activity and the energy level above the threshold may indicate presence of network activity. The energy detector 312 may then attempt to verify that the change in the state of the network activity is not due to spurious noise. In step 365, the energy detector 312 may wait an appropriate amount of time according to the enter cable-sense mode timer delay or exit cable-sense mode timer delay. For example, the enter cable-sense mode timer delay may be used if the change in network activity level is from a presence of activity to a lack of activity. Similarly, the exit cable-sense mode timer delay may be used if the change in network activity level is from a lack of activity to a presence of activity.

In step 370, the energy detector 312 may determine the network activity level again. The state of the activity level may be compared to the state determined in step 360. If the state of the activity level is the same as the state from step 360, the change in the state of the activity level found in step 360 may be valid. If the states are different, then the change in the state of the activity level found in step 360 may be invalid. In step 375, the network activity detected signal Energy_Detect may be asserted or deasserted appropriately if the change in the state of the activity level found in step 360 is valid. For example, if there is a valid change in the state from a lack of network activity to a presence of network activity, the network activity detected signal Energy_Detect may be asserted. Similarly, if there is a valid change in the state from a presence of network activity to a lack of network activity, the network activity detected signal Energy_Detect may be deasserted. If the change is determined to be invalid, the network activity detected signal Energy_Detect may not be changed.

Figure 3C:
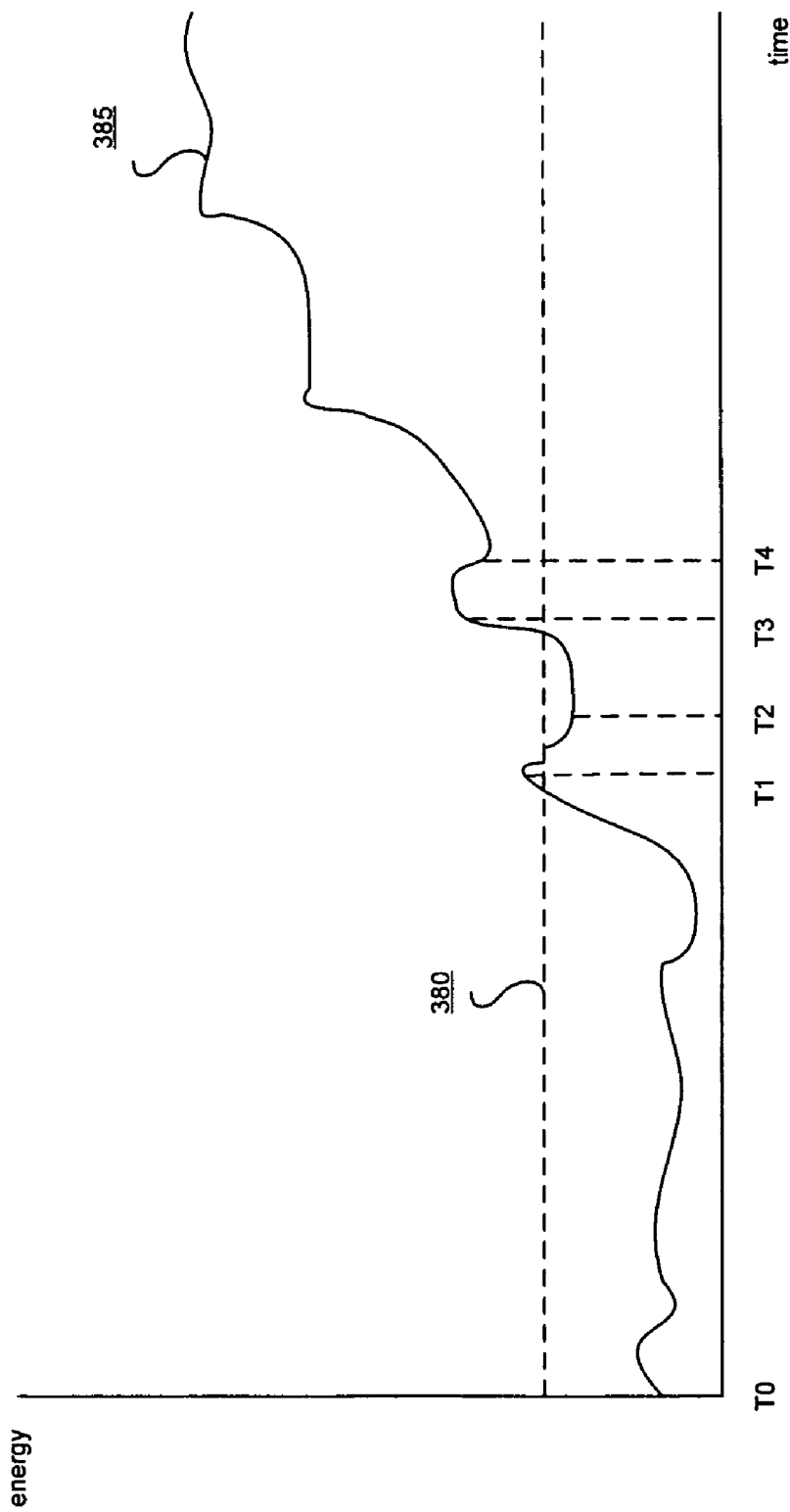
FIG. 3c is an exemplary graph of network energy detected versus time, in accordance with an embodiment of the invention.

FIG. 3c is an exemplary graph of network energy detected versus time, in accordance with an embodiment of the invention. Referring to FIG. 3c, there is shown an energy threshold level 380 and network link energy level 385 on the network link 311. The network link energy level 385 may vary over time. At a time instant T0, the network link energy level 385 may be below the energy threshold level 380. At a time instant T1, the network link energy level 385 may be above the energy threshold level 380. Accordingly, the energy detector 312 may detect the change in the network link energy level 385 from below the energy threshold level 380 to above the energy threshold level 380. The energy detector 312 may wait for a period of time specified by a exit cable-sense mode timer delay, which may be the period of time from the time instant T1 to a time instant T2. The energy detector may determine at the time instant T2 that the network link energy level 385 may be below the energy threshold level 380. Therefore, the energy detector 312 may not assert network activity detected signal Energy_Detect.

At a time instant T3, the network link energy level 385 may be above the energy threshold level 380. Accordingly, the energy detector 312 may detect the change in the network link energy level 385 from below the energy threshold level 380 to above the energy threshold level 380. The energy detector 312 may wait for period of time specified by the exit cable-sense mode timer delay, which may be the period of time from the time instant T3 to a time instant T4. The energy detector may determine at the time instant T4 that the network link energy level 385 may be above the energy threshold level 380. Therefore, the energy detector 312 may assert network activity detected signal Energy_Detect.

Figure 4A:
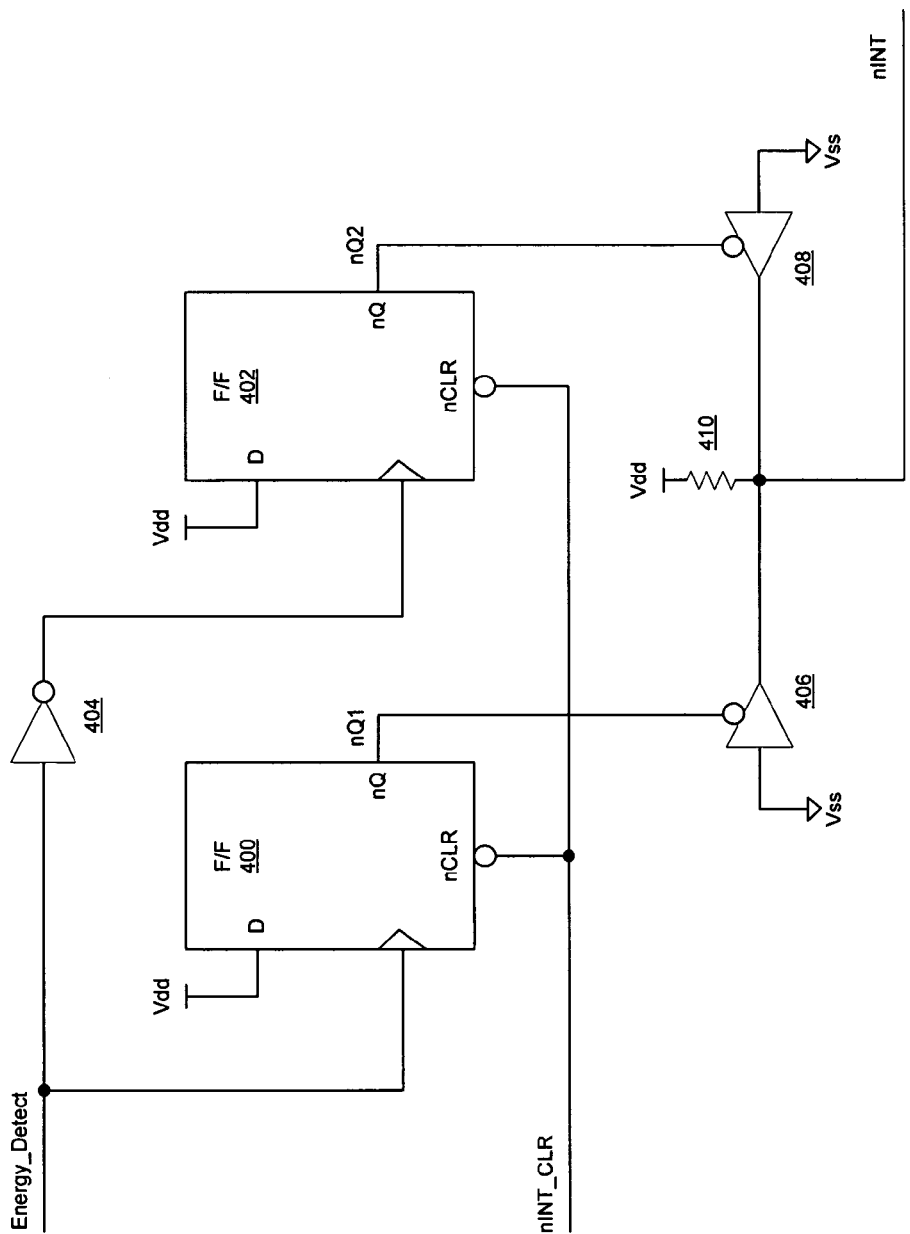
FIG. 4a is a schematic illustrating an exemplary interrupt generation logic, which may be utilized for generating an interrupt signal, in accordance with an embodiment of the invention.

FIG. 4a is a schematic illustrating an exemplary interrupt generation logic, which may be utilized for generating an interrupt signal, in accordance with an embodiment of the invention. Referring to FIG. 4a, there is shown D flip-flops 400 and 402, an inverting buffer 404, non-inverting tri-state buffers 406 and 408, and a resistor 410. The network activity detected signal Energy_Detect may be, for example, an active high signal that may be communicated to a clock input of the D flip-flop 400 and to an input of the inverting buffer 404. An output of the inverting buffer 404 may be coupled to a clock input of the D flip-flop 402. A higher voltage potential Vdd of a power supply may be communicated to a D input of each of the D flip-flops 400 and 402. Generally, signals may be active low or active high. An active low signal may be asserted when it is at a low voltage level, and deasserted when it is at a high voltage level. An active high signal may be asserted when it is at a high voltage level and deasserted when it is at a low voltage level.

An active low interrupt clear signal nINT_CLR may be communicated to the D flip-flops 400 and 402 to clear the outputs of the D flip-flops 400 and 402. An active low output nQ of each of the D flip-flops 400 and 402 may be coupled to an enable input of non-inverting tri-state buffers 406 and 408, respectively. Inputs of the non-inverting tri-state buffers 406 and 408 may be coupled to a lower voltage potential Vss of a power supply. An output of each of the non-inverting tri-state buffers 406 and 408 may be coupled together, and may be an output signal line. The output signal line may be coupled to the higher voltage potential Vdd by a pull-up resistor 410. The output signal line may communicate an active low interrupt signal nINT to, for example, the chipset 107 to initiate an interrupt request to the CPU 105.

In operation, the output signals at the outputs nQ of each of the D flip-flops 400 and 402 may be at a high voltage state. This may be a result of an assertion of the active low interrupt clear signal nINT_CLR during, for example, power-up reset. Therefore, the non-inverting tri-state buffers 406 and 408 may not be enabled. The active low interrupt signal nINT may, therefore, be pulled up to a de-asserted high voltage state. When the energy detector 312 determines there is network activity, the active high network activity detected signal Energy_Detect may be asserted to a high voltage state.

Accordingly, a rising edge of the asserted active high network activity detected signal Energy_Detect may clock the D flip-flop 400 to drive its nQ output to a low voltage state.

The low voltage state of the nQ output of the D flip-flop 400 may enable the non-inverting tri-state buffer 406. Accordingly, the active low interrupt signal nINT may be asserted to a low voltage state. The active low interrupt signal nINT may be communicated to, for example, the chipset 107 to initiate an interrupt to the CPU 105. The CPU 105 may then execute instructions in an interrupt routine that may, for example, sample the voltage level of the network activity detected signal Energy_Detect. Since the voltage level of the active high network activity detected signal Energy_Detect may be high, the CPU 105 may execute instructions in the interrupt routine to power up the NAC 109. The CPU 105 may also execute instructions in an interrupt routine to assert the active low interrupt clear signal nINT_CLR for a period of time to clear the active low interrupt signal nINT.

Subsequently, the energy level detected by the energy detector 312 may be lower than the threshold energy level. Accordingly, the energy detector 312 may deassert the active high network activity detected signal Energy_Detect. The de-asserted active high network activity detected signal Energy_Detect may be driven to a low voltage state. Accordingly, a falling edge of the de-asserted active high network activity detected signal Energy_Detect may be inverted by the inverting buffer 404. The resulting rising edge of the inverted signal at the output of the inverting buffer 404 may clock the D flip-flop 402 to drive its nQ output to a low voltage state. The low voltage state of the nQ output of the D flip-flop 402 may enable the non-inverting tri-state buffer 408. Accordingly, the active low interrupt signal nINT may be asserted at a low voltage state.

The active low interrupt signal nINT may be communicated to, for example, the chipset 107 to initiate an interrupt to the CPU 105. The CPU 105 may then, for example, execute an interrupt routine that may have instructions to sample the voltage level of the active high network activity detected signal Energy_Detect. Since the voltage level of the active high network activity detected signal Energy_Detect may be low, the CPU 105 may execute instructions in the interrupt routine to power down the NAC 109. The CPU 105 may also execute instructions to assert the active low interrupt clear signal nINT_CLR for a period of time to clear the active low interrupt signal nINT.

Figure 4B:
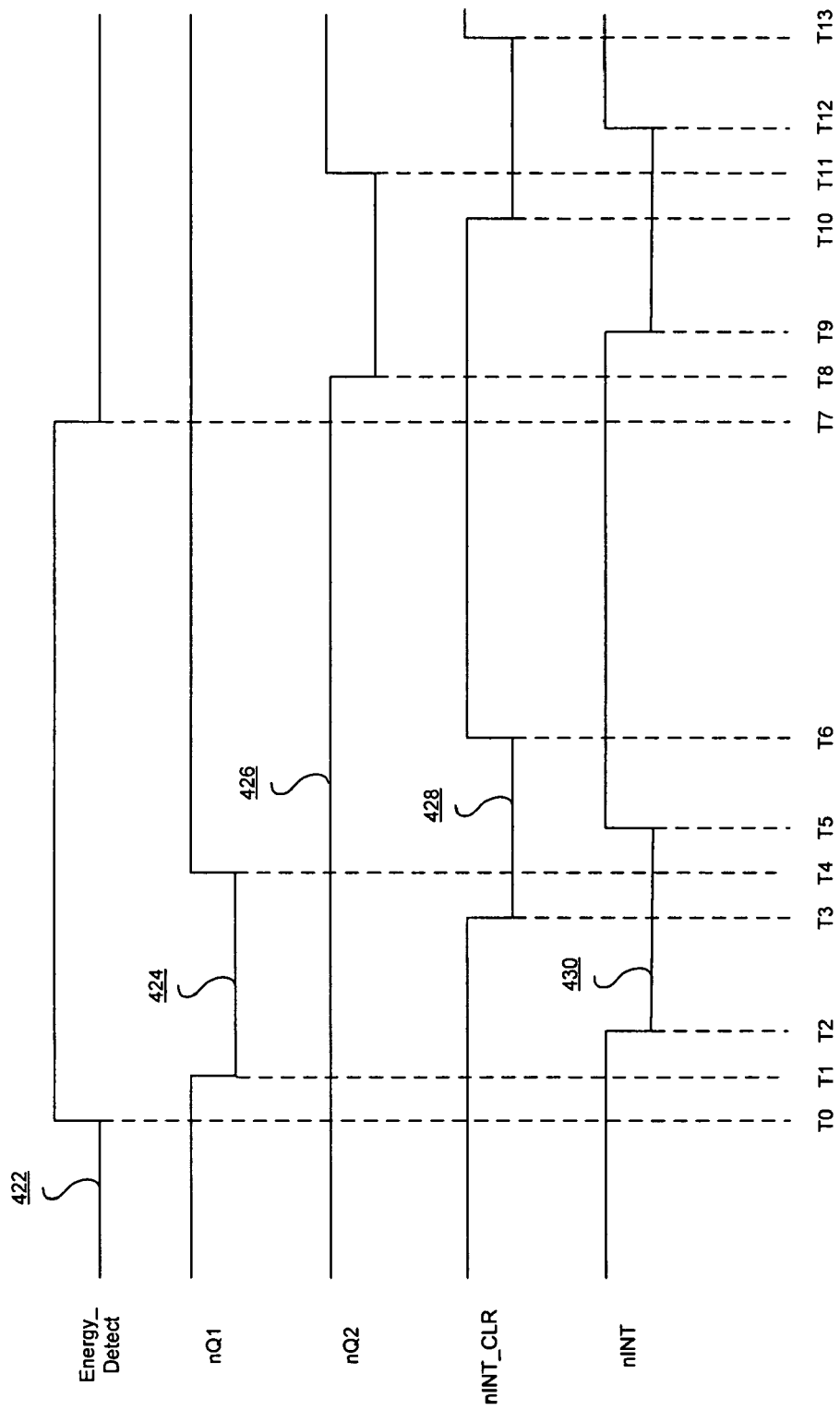
FIG. 4b is a timing diagram illustrating an exemplary timing of interrupt generation of the interrupt generation logic of FIG. 4a, in accordance with an embodiment of the invention.

FIG. 4b is a timing diagram illustrating an exemplary timing of interrupt generation of the interrupt generation logic of FIG. 4a, in accordance with an embodiment of the invention. Referring to FIG. 4b, there is shown an active high network activity detected signal Energy_Detect 422, an active low output signal nQ1 424, an active low output signal nQ2 426, an active low interrupt clear signal nINT_CLR 428, and an active low interrupt signal nINT 430. An asserted active high signal may be at a higher voltage level than an unasserted active high signal. An asserted active low signal may be at a lower voltage level than an unasserted active low signal.

The energy detector 312 may detect network activity and assert the active high network activity detected signal Energy_Detect 422 at a time instant T0. The rising edge of the active high network activity detected signal Energy_Detect 402 may clock the D flip-flop 400. This may result in the active low output signal nQ1 424 being asserted at a time instant T1. The asserted active low output signal nQ1 424 may lead to an assertion of the active low interrupt signal nINT 430 at a time instant T2. The asserted active low interrupt signal nINT 430 may lead to execution of an interrupt routine, for example, a portion of the interrupt routines 102, by the CPU 105.

A portion of the interrupt routines 102 may be executed to assert the active low interrupt clear signal nINT_CLR 428 from a time instant T3 to a time instant T6. As a result, the active low output signal nQ1 424 may be deasserted at a time instant T4, and this may deassert the active low interrupt signal nINT 430 at a time instant T5. Portions of the interrupt routines 102 may be executed, for example, to determine the voltage level of the input network activity detected signal Energy_Detect 422. Since the input network activity detected signal Energy_Detect 422 may be asserted to a high voltage level, the CPU 105 may execute portions of the interrupt routines 102 to power up the NAC 109.

At a later time, the energy detector 312 may no longer detect network activity, and as a result may deassert the active high network activity detected signal Energy_Detect 422 at a time instant T7. The falling edge of the active high network activity detected signal Energy_Detect 422 may be inverted by the inverting buffer 404. The resulting rising edge at an output of the inverting buffer 404 may clock the D flip-flop 402. This may result in the active low output signal nQ2 426 being asserted at a time instant T8. The asserted active low output signal nQ2 426 may lead to the assertion of the active low interrupt signal nINT 430 at a time instant T9. The asserted active low interrupt signal nINT 430 may lead to execution of a portion of the interrupt routines 102 by the CPU 105.

Portions of the interrupt routines 102 may be executed to assert the active low interrupt clear signal nINT_CLR 428 from a time instant T10 to a time instant T13. As a result, the active low output signal nQ2 426 may be deasserted at a time instant T11, and this may deassert the active low interrupt signal nINT 430 at a time instant T12. Portions of the interrupt routines 102 may be executed, for example, to determine the voltage level of the input network activity detected signal Energy_Detect 422. Since the input network activity detected signal Energy_Detect 422 may be deasserted to a low voltage level, the CPU 105 may execute portions of the interrupt routines 102 to power down the NAC 109.

Figure 5:
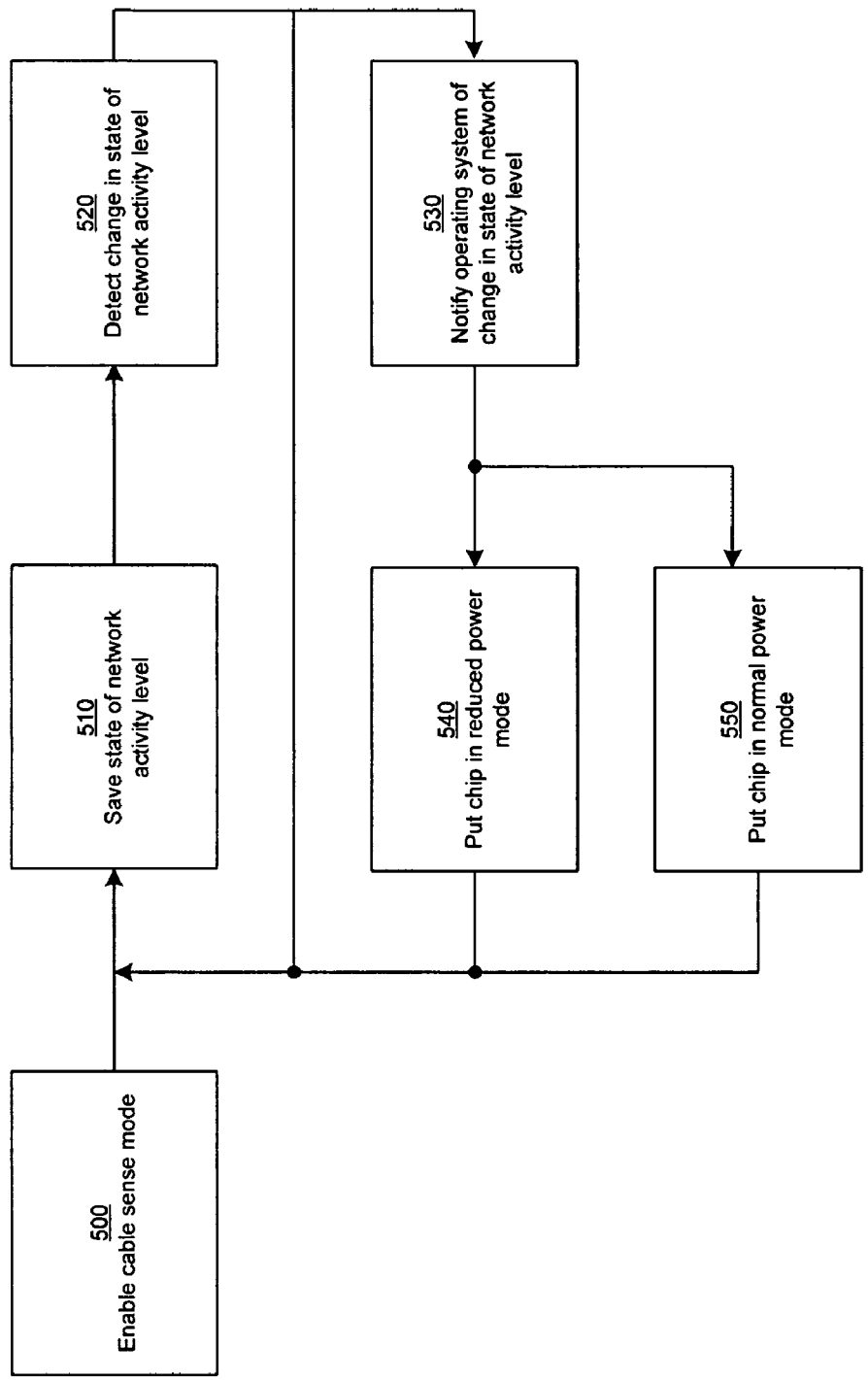
FIG. 5 is a flow diagram illustrating an exemplary routine for implementing cable sense mode, in accordance with an embodiment of the invention.

FIG. 5 is a flow diagram illustrating an exemplary routine for implementing cable sense mode, in accordance with an embodiment of the invention. Step 500 may comprise enabling the cable sense mode. Step 510 may comprise saving the state of the network activity detected signal Energy_Detect. Step 520 may comprise detecting change in the network activity detected signal Energy_Detect. Step 530 may comprise notifying a CPU of chip power status. Step 540 may comprise putting a chip in reduced power mode. Step 550 may comprise powering up a chip.

Referring to FIG. 5, and with respect to FIG. 3a, there is shown a plurality of steps 500 to 550 that may be utilized to power up, or reduce power to, a network adapter chip, for example, the NAC 109. In step 500, the cable sense mode may be enabled by a CPU, for example, the CPU 105. This mode may allow, based on the network activity detected signal Energy_Detect from the energy detector 312, the CPU 105 to either power up the NAC 109 from a reduced power mode or put the NAC 109 in reduced power mode. In step 510, the CPU 105 may save the state of the network activity detected signal Energy_Detect for future use. The saved state of the network activity detected signal Energy_Detect may be compared to a state of the network activity detected signal Energy_Detect at later times in order to verify that a change in the signal did occur.

In step 520, the network activity detected signal Energy_Detect may change based on the energy detector 312 monitoring network activity. The change may be detected by the CPU 105 polling the network activity detected signal Energy_Detect. Alternatively, the change may be detected by using the change in network activity detected signal Enery_Detect to generate an interrupt to the CPU 105. The CPU 105 may then determine the state of the network activity detected signal Energy_Detect. The determined state of the network activity detected signal Energy_Detect may be compared to the saved state of the network activity detected signal Energy_Detect from step 510. If the network activity detected signal Energy_Detect is the same state as the saved state, nothing may need to be done, and the next step may be step 510. However, if the network activity detected signal Energy_Detect is a different state from the saved state, the next step may be step 530.

In step 530, the state of the network activity detected signal Energy_Detect may be communicated to the CPU 105. The CPU 105 may appropriately enable or disable device drivers, for example, the device drivers 104, as needed. For example, there may be device drivers that may depend on at least a portion of the NAC 109 being powered up. If that portion of NAC 109 is powered down, the device driver may cause a system error by trying to access that portion. Therefore, some device drivers, for example, the device driver for the PCIe SerDes 315, may need to be disabled before the NAC 109 is powered down. Similarly, the CPU 105 may need to enable some device drivers after the NAC 109 is powered up. This may be to reduce the chances of the device driver trying to access the NAC 109 before it is powered up and ready to respond. This may be described in more detail with respect to the U.S. patent application Ser. No. 11/269,064 filed on Nov. 8, 2005.

If the sampled state indicates that no network activity is detected, the next step may be step 540. No network activity may be because the network cable is not plugged in, and/or because there is no other active node on the network. If the sampled state indicates that there is network activity detected, the next step may be step 550. Network activity may be detected because the network cable has been plugged in and/or because there is at least one active node on the network.

In step 540, the CPU 105 may cause the power down signal LOW_PWR_MODE from the chipset 107 to the NAC 109 to be asserted. Upon reception of the asserted power down signal LOW_PWR_MODE, the NAC 109 may power down by reducing voltage to at least some of the circuitry in the NAC 109. Some circuitry in the NAC 109 may not be powered down completely. For example, the energy detector 312 may not be powered down so that it may be able to monitor signal activity on the network. In this manner, when the energy detector 312 detects network activity, the energy detector 312 may notify the CPU 105 that there is signal activity on the network. The CPU 105 may then take steps to have the NAC 109 power up in order to be able to receive network data and to be able to transmit data to the network. The next step may be step 510.

In step 550, The CPU 105 may issue commands that may result in the power down signal LOW_PWR_MODE signal being de-asserted. In response to the de-assertion of the power down signal LOW_PWR_MODE, the NAC 109 may execute a power up sequence. For example, the power up sequence may comprise a power-up reset in order to bring the NAC 109 to a known active state. The network activity detected signal Energy_Detect may be asserted during the NAC 109 power-up reset. The next step may be step 510.

In accordance with an embodiment of the invention, aspects of the system may comprise an energy detector 312 within a network adapter chip (NAC) 109 that detects an energy level of an Ethernet link, for example, the network link 311. The Ethernet link may couple the NAC 109 to a network, for example, an Ethernet network. Power to the NAC 109 may be adjusted based on the detected energy level. The power supplied to the NAC 109 may be reduced if the detected energy level of the Ethernet link is less than a particular energy level. Alternatively, power may be supplied to the NAC 109 if the detected energy level of the Ethernet link is greater than or equal to a particular energy level. In such cases, the power supplied to the NAC 109 may be sufficient to enable the NAC 109 to have full functionality.

The energy detector 312 may generate an output signal that indicates a change in the detected energy level of the Ethernet link. Additionally, an interrupt generator 314 may generate an interrupt signal that indicates a change in the energy level of the Ethernet link. Accordingly, power may be supplied to the energy detector 312, and to the interrupt generator 314, even when there is no network activity detected by the energy detector 312. There may be at least one device driver that controls at least one hardware device, for example, the PCIe SerDes 315, within the NAC 109. The device driver for the PCIe SerDes 315 may be disabled prior to reducing power for the NAC 109. The device driver for the PCIe SerDes 315 may be enabled subsequent to providing power to the NAC 109. The NAC 109 may be reset when power is supplied to the network adapter chip when it is in a reduced power state.

Although some embodiments of the invention may have been described as detecting signal activity on a wired network, for example, the Ethernet network, the invention need not be so limited. For example, detection of energy levels for a wireless network system may also be used to power down and power up a wireless network interface chip to conserve power.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present inven-

What is claimed is:

1. A method for regulating power, the method comprising:
   detecting within a network adapter chip, an energy level of an Ethernet link that couples said network adapter chip to a network;
   waiting a delay period having a duration selected to filter out periods of spurious activity or inactivity of the Ethernet link;
   verifying within said network adapter chip, said detected energy level at or after an end of the delay period; and
   adjusting within said network adapter chip, power supplied to said network adapter chip based on said detected energy level.

2. The method according to claim 1, comprising reducing said power supplied to said network adapter chip based on said detecting.

3. The method according to claim 1, comprising reducing said power supplied to said network adapter chip if said detected energy level of said Ethernet link is less than a particular energy level.

4. The method according to claim 1, comprising supplying said power to said network adapter chip based on said detecting.

5. The method according to claim 1, comprising supplying said power to said network adapter chip if said detected energy level of said Ethernet link is greater than or equal to a particular energy level.

6. The method according to claim 1, comprising generating within said network adapter chip an interrupt signal that indicates a change in said energy level of said Ethernet link.

7. The method according to claim 6, comprising supplying said power to a portion of said network adapter chip that generates said interrupt signal.

8. The method according to claim 1, comprising generating within said network adapter chip an output signal that indicates a change in said detected energy level of said Ethernet link.

9. The method according to claim 8, comprising supplying said power to a portion of said network adapter chip that generates said output signal.

10. The method according to claim 1, comprising disabling one or more device drivers that control one or more hardware devices within said network adapter chip prior to said adjusting.

11. The method according to claim 1, comprising enabling one or more device drivers that control one or more hardware devices within said network adapter chip subsequent to said adjusting.

12. The method according to claim 1, comprising resetting said network adapter chip when said power is supplied to said network adapter chip when it is in a reduced power state.

13. A system for regulating power, the system comprising:
   one or more circuits for use within a network adapter chip, said one or more circuits comprising an energy detector, wherein said energy detector is operable to detect an energy level of an Ethernet link that couples said network adapter chip to a network;
   said one or more circuits are operable to verify said detected energy level at or after an end of a delay period, wherein said delay period has a duration selected to filter out periods of spurious activity or inactivity of the Ethernet link; and
   said one or more circuits are operable to adjust power supplied to said network adapter chip based on said detected energy level.

14. The system according to claim 13, wherein said one or more circuits are operable to reduce said power supplied to said network adapter chip based on said detecting.

15. The system according to claim 13, wherein said one or more circuits are operable to reduce said power supplied to said network adapter chip if said detected energy level of said Ethernet link is less than a particular energy level.

16. The system according to claim 13, wherein said one or more circuits are operable to supply said power to said network adapter chip based on said detecting.

17. The system according to claim 13, wherein said one or more circuits are operable to supply said power to said network adapter chip if said detected energy level of said Ethernet link is greater than or equal to a particular energy level.

18. The system according to claim 13, wherein said one or more circuits comprise an interrupt generator, wherein said interrupt generator is operable to generate an interrupt signal that indicates a change in said energy level of said Ethernet link.

19. The system according to claim 18, wherein said one or more circuits are operable to supply said power to said interrupt generator.

20. The system according to claim 13, wherein said energy detector is operable to generate an output signal that indicates a change in said detected energy level of said Ethernet link.

21. The system according to claim 20, wherein said one or more circuits are operable to supply said power to said energy detector.

22. The system according to claim 13, comprising one or more device drivers that are operable to control one or more hardware devices within said network adapter chip, said one or more device drivers being operable to be disabled prior to said adjusting.

23. The system according to claim 13, comprising one or more device drivers that are operable to control one or more hardware devices within said network adapter chip, said one or more device drivers being operable to be enabled subsequent to said adjusting.

24. The system according to claim 13, wherein said network adaptor chip is reset when said power is supplied to said network adapter chip when it is in a reduced power state.

25. The method according to claim 1, wherein said delay period is a period of time to verify a presence of network activity.

26. The method according to claim 1, wherein said delay period is a period of time to verify a lack of network activity.

27. The method according to claim 1, wherein said delay period is a predetermined delay period.

28. The system according to claim 13, wherein said delay period is a period of time to verify a presence of network activity.

29. The system according to claim 13, wherein said delay period is a period of time to verify a lack of network activity.

30. The system according to claim 13, wherein said delay period is a predetermined delay period.

* * * * *